United States Patent [19]

Zider et al.

[11] Patent Number: 4,896,955
[45] Date of Patent: * Jan. 30, 1990

[54] EYEGLASS FRAME INCLUDING SHAPE-MEMORY ELEMENTS

[75] Inventors: Robert B. Zider, Portola Valley; John F. Krumme, Woodside, both of Calif.

[73] Assignee: CVI/Beta Ventures, Inc., Menlo Park, Calif.

[ * ] Notice: The portion of the term of this patent subsequent to Sep. 20, 2005 has been disclaimed.

[21] Appl. No.: 309,205

[22] Filed: Dec. 5, 1988

Related U.S. Application Data

[63] Continuation-in-part of Ser. No. 876,077, Jun. 19, 1986, Pat. No. 4,772,112, which is a continuation-in-part of Ser. No. 676,823, Nov. 30, 1984, abandoned, which is a continuation-in-part of Ser. No. 558,604, Dec. 6, 1983, abandoned.

[51] Int. Cl.⁴ .............................................. G02C 1/04
[52] U.S. Cl. ........................................ 351/41; 351/106
[58] Field of Search ..................... 351/41, 86, 106, 111, 351/114, 117, 121, 153, 154

[56] References Cited

U.S. PATENT DOCUMENTS

| | | | |
|---|---|---|---|
| 1,457,608 | 6/1923 | Schumacher | 351/102 |
| 1,461,071 | 7/1923 | Schumacher . | |
| 1,479,936 | 1/1924 | Stevens | 29/20 |
| 1,609,110 | 11/1926 | Brown | 29/20 |
| 1,613,202 | 1/1927 | Schumacher | 351/102 |
| 1,637,029 | 7/1927 | Schumacher . | |
| 1,708,135 | 4/1929 | Harper | 215/246 |
| 1,785,929 | 7/1930 | Bouchard . | |
| 1,845,582 | 2/1932 | Courtright | 351/116 |
| 2,169,235 | 8/1939 | Foster | 351/116 |
| 2,192,208 | 3/1940 | Stevens . | |
| 2,210,507 | 8/1940 | Spill | 351/116 |
| 2,305,562 | 12/1942 | Thompson et al. . | |
| 2,379,928 | 7/1945 | Rosenheim . | |
| 2,510,358 | 6/1950 | Wolf . | |
| 2,585,352 | 2/1952 | Silverman . | |
| 2,768,475 | 10/1956 | Seelen et al. | 29/447 |
| 2,994,933 | 8/1961 | Wolfe | 411/909 |
| 3,156,756 | 11/1964 | Seaver . | |
| 3,162,933 | 12/1964 | Trax et al. | 29/447 |
| 3,243,211 | 3/1966 | Wetmore | 403/28 |
| 3,320,106 | 5/1967 | Kirkpatrick et al. . | |
| 3,569,901 | 3/1971 | Connor | 411/909 |
| 3,582,457 | 6/1971 | Barthell . | |
| 3,597,053 | 8/1971 | Mastman | 351/41 |
| 3,619,478 | 11/1971 | Staiger | 174/68.5 |
| 3,622,941 | 11/1971 | Wetmore | 339/98 |
| 3,709,587 | 1/1973 | Wick | 351/106 |
| 3,711,134 | 1/1973 | Goldberg | 287/100 |
| 3,725,972 | 4/1973 | McCabe | 16/48.5 |
| 3,727,173 | 4/1973 | Goldmann et al. | 339/74 R |
| 3,740,839 | 6/1973 | Otte et al. | 29/628 |
| 3,744,887 | 7/1973 | Dunbar | 351/153 |
| 3,783,429 | 1/1974 | Otte | 337/393 |
| 3,816,902 | 6/1974 | Beer | 29/446 |
| 3,832,603 | 8/1974 | Cray et al. | 317/101 D |

(List continued on next page.)

FOREIGN PATENT DOCUMENTS

| | | |
|---|---|---|
| 3209508A1 | 12/1982 | Fed. Rep. of Germany . |
| 2388293 | 12/1978 | France ................. 351/114 |
| 52-46843 | 4/1977 | Japan . |
| 5608111 | 3/1979 | Japan ................... 351/41 |
| 54-63849 | 5/1979 | Japan . |
| 5213052 | 5/1979 | Japan . |
| 54-163052 | 12/1979 | Japan . |
| 55-48725 | 4/1980 | Japan . |
| 53120420 | 4/1980 | Japan . |
| 56-70520 | 6/1981 | Japan . |
| 56-705520 | 6/1981 | Japan . |

(List continued on next page.)

Primary Examiner—Rodney B. Bovernick
Assistant Examiner—J. Patrick Ryan
Attorney, Agent, or Firm—Burns, Doane, Swecker & Mathis

[57] ABSTRACT

Eyeglass frames fabricated from shape-memory alloys which have optimized elasticity properties which exhibit a combination of shape-memory and elastic properties, which utilize the shape-memory property of these alloys in fastening elements, or which utilize the flexibility and fatigue resistance of the martensite state of the alloys as a hinge element are disclosed.

8 Claims, 4 Drawing Sheets

U.S. PATENT DOCUMENTS

| | | | |
|---|---|---|---|
| 3,913,444 | 10/1975 | Otte | 85/8.3 |
| 3,923,237 | 12/1975 | Bostrom et al. | 229/43 |
| 3,998,513 | 12/1976 | Kobayashi et al. | 339/59 M |
| 3,999,790 | 12/1976 | Rogen | 292/201 |
| 4,169,309 | 10/1979 | Meginnis | 29/447 |
| 4,206,537 | 6/1980 | Meginnis | 29/447 |
| 4,236,281 | 12/1980 | Bottum | 24/115 R |
| 4,237,609 | 12/1980 | Clabburn et al. | 29/859 |
| 4,244,488 | 1/1981 | Fridl et al. | 220/260 |
| 4,293,942 | 10/1981 | Baumgartner | 368/280 |
| 4,294,559 | 10/1981 | Schutzler | 403/28 |
| 4,297,779 | 11/1981 | Melton et al. | 29/446 |
| 4,345,848 | 8/1982 | Cheselka | 403/157 |
| 4,412,872 | 11/1983 | Albrecht et al. | 148/11.5 F |
| 4,462,651 | 7/1984 | McGaffigan | 339/30 |
| 4,472,035 | 9/1984 | Takamura et al. | 351/41 |
| 4,533,411 | 8/1985 | Melton | 148/11.5 R |
| 4,772,112 | 4/1988 | Zider et al. | 351/41 |
| 4,779,971 | 10/1988 | Chospice | 351/41 |

FOREIGN PATENT DOCUMENTS

| | | | |
|---|---|---|---|
| 54148106 | 6/1981 | Japan . | |
| 56-89715 | 7/1981 | Japan . | |
| 56-89716 | 7/1981 | Japan . | |
| 56-89717 | 7/1981 | Japan . | |
| 56-94321 | 7/1981 | Japan . | |
| 54168494 | 7/1981 | Japan . | |
| 54168495 | 7/1981 | Japan . | |
| 54173066 | 7/1981 | Japan . | |
| 55476 | 8/1981 | Japan . | |
| 56-95214 | 8/1981 | Japan . | |
| 56-95215 | 8/1981 | Japan . | |
| 56-99317 | 8/1981 | Japan . | |
| 54171791 | 8/1981 | Japan . | |
| 54171792 | 8/1981 | Japan . | |
| 56-153317 | 11/1981 | Japan . | |
| 5557238 | 11/1981 | Japan . | |
| 57-115517 | 7/1982 | Japan . | |
| 0115517 | 7/1982 | Japan | 351/41 |
| 57-115518 | 7/1982 | Japan . | |
| 56182258 | 7/1982 | Japan . | |
| 56182259 | 7/1982 | Japan . | |
| 57-178215 | 11/1982 | Japan . | |
| 5663743 | 11/1982 | Japan . | |
| 58-179818 | 10/1983 | Japan . | |
| 58-179819 | 10/1983 | Japan . | |
| 59-136619 | 9/1984 | Japan . | |
| 60-22117 | 2/1985 | Japan . | |
| 60-93414 | 5/1985 | Japan . | |
| 60-168123 | 11/1985 | Japan . | |
| 338475 | 4/1930 | United Kingdom | 351/117 |
| 1156162 | 2/1980 | United Kingdom . | |
| 1579734 | 11/1980 | United Kingdom . | |
| 2095480A | 9/1982 | United Kingdom . | |
| 2095480 | 9/1982 | United Kingdom . | |

OTHER PUBLICATIONS

Schetky, L. McDonald, "Shape-Memory Alloys", *Encyclopedia of Chemical Technology*.

"Crystal Structure and Microstructure of a Cold Worked TiNi Alloy with Unusual Elastic Behavior", T. Tadaki and C. M. Wayman, Scripta Metallurgica, vol. 14, pp. 911–914, 1980.

"Some Applications of Shape-Memory Alloys", C. M. Wayman, Journal of Metals, June, 1980, pp. 129–137.

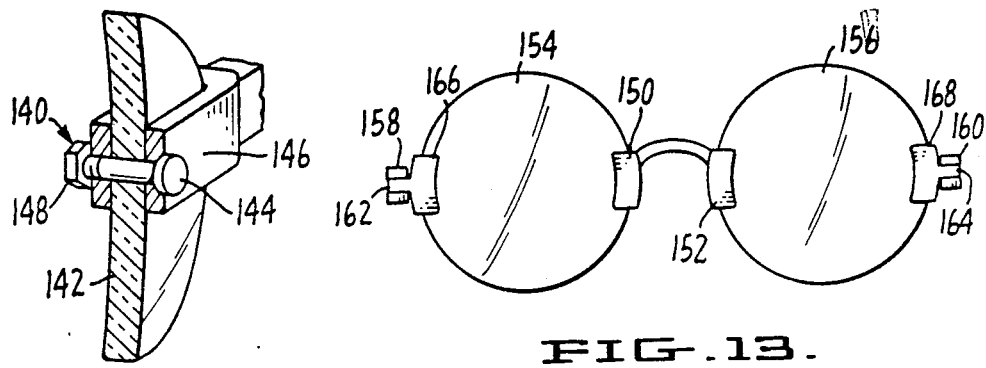
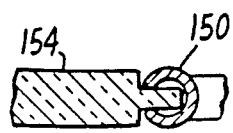
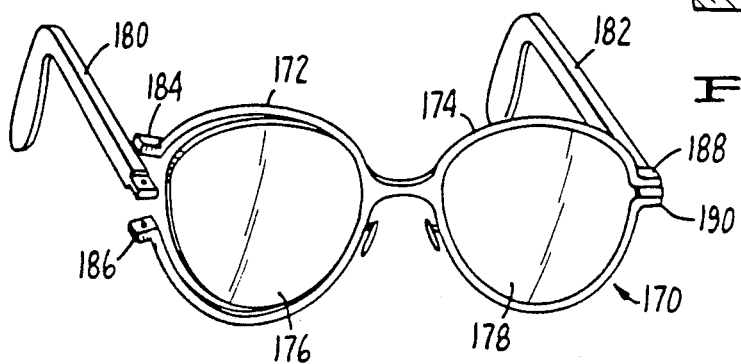
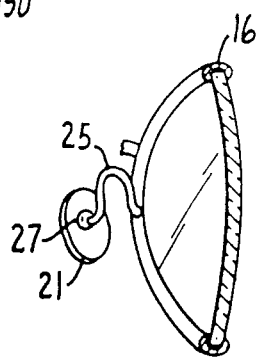
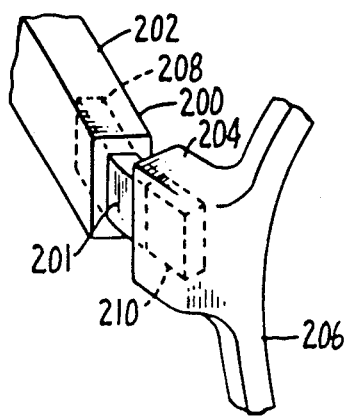
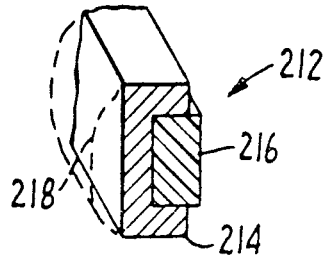

EYEGLASS FRAME INCLUDING SHAPE-MEMORY ELEMENTS

This application is a continuation-in-part of U.S. patent application Ser. No. 876,077 filed June 19, 1986, now U.S. Pat. No. 4,772,112, which is in turn a continuation-in-part of U.S. patent application Ser. No. 676,823 filed Nov. 30, 1984, now abandoned, which is in turn a continuation-in-part of U.S. patent application Ser. No. 558,604 filed Dec. 6, 1983, now abandoned.

FIELD OF THE INVENTION

The present invention relates to frames for eyeglasses and more particularly to frames fabricated from shape-memory alloys.

BACKGROUND OF THE INVENTION

The metals which have historically been used to make metal eyeglass frames have usually been chosen in large part for their ease of fabrication. Metals such as nickel-silver, monel, and phosphor bronze have fairly high yield strength but quite low work-hardening, which allows them to accept large deformations during manufacture. In use, however, they tend to bend rather suddenly and in quite localized sections if their yield strength is exceeded. Such sharp bends are very difficult to removed without leaving "kinks" in the bent section. The higher strength frame materials, such as high strength stainless steels and beryllium-copper, are able to withstand much higher elastic strains without permanent deformation. They are still limited to only about 1% elastic strain, however, and if their yield strength is exceeded a bend is formed which is difficult to remove.

A number of references such as U.S. Pat. No. 4,472,035, Japanese Patent Publication No. 57-115517(A) and Japanese Patent JP-084714 have suggested the use of shape-memory alloys, especially the nickel-titanium alloys, for use as frame components due to their "superelastic" or "pseudoelastic" properties. Although these terms are often mistakenly used interchangeably, they refer to two distinctly different properties of the alloys. Careful study of all of these references, specifically U.S. Pat. No. 4,472,035 and Japanese Patent JP-084714, shows that the elastic property cited is the "pseudoelastic" property of shape-memory alloys. This pseudoelasticity occurs in a limited temperature range slightly above the stress-free austenite to martensite transformation temperature. It involves the creation of stress-induced martensite which simultaneously undergoes strain as it forms to relieve the applied stress. As soon as the applied stress is removed, the thermally unstable martensite reverts to austenite, and the strain spontaneously returns to zero. This behavior gives a very high apparent elasticity to the material without inducing any permanent strain, but is narrowly limited in the temperature range where it can be utilized in a given alloy. Because the pseudoelasticity depends upon behavior within a narrow portion of the transformation temperature spectrum, lowering the temperature as little as 10° C. may change the behavior to normal shape-memory. In this case a deformed component will remain deformed unless it is heated. Also, the yield strength of this alloy, if it is annealed to give good pseudoelastic properties, is too low at low temperatures to function as a satisfactory component. Conversely, if the pseudoelastic component is heated by as little as 10° C., the amount of pseudoelastic strain is significantly reduced. At even higher temperatures the pseudoelasticity is eliminated because the stress needed to stress induce the martensite exceeds the yield strength of the austenite, and permanent deformation results. Thus, the effective useful temperature range for purely pseudoelastic components may be as little as 20° C. This range is too narrow to be of service to eyeglass frames which must function in winter days as cold as −20° C. and in hot sunny days with possible temperatures over 40° C.

Thus, while both the elastic properties and memory properties of shape-memory alloys have been discussed as potentially useful in eyeglass frames, it is clear that previous workers have not fully understood the limitations on the use of these materials, nor have they revealed any information on the proper thermo-mechanical processing necessary to utilize the alloys as frame components.

SUMMARY OF THE INVENTION

It is the purpose of the instant invention to provide eyeglass frames which (1) are highly resistant to permanent deformation, or "kinking", over the full range of ambient temperatures, or (2) are sufficiently resistant to deformation and are readily restorable to the undeformed shape by heating, or (3) are easily disassembled and reassembled, or (4) do not require screws in the hinges.

To accomplish this purpose there is provided frames having portions thereof fabricated from shape-memory alloys which (1) have the combination of superelastic and work-hardened pseudoelastic properties, hereinafter "optimized elasticity" properties, or (2) exhibit a combination of shape-memory and elastic properties, or (3) utilize the shape-memory property of these alloys in fastening elements, or (4) utilize the flexibility and fatigue resistance of the martensite state of the alloys as a hinge element.

In one aspect of the invention, there is provided an eyeglass frame having at least a pair of rims and a pair of corresponding temples, and having at least a portion thereof fabricated from shape-memory alloy work-hardened at least 30% and having greater than 3% elasticity over a temperature range from −20° C. to +40° C.

In another aspect of the invention, there is provided an eyeglass frame having at least a pair of rims and a pair of corresponding temples, and having at least a portion thereof fabricated from shape-memory alloy work-hardened at least 30%, followed by a heat treatment at a temperature not exceeding 400° C. for not less than one hour, and having a minimum of 3% heat-recoverable shape-memory, a yield strength greater than 30,000 psi (207 MPa [MegaPascal]), and at least 3% elasticity.

In yet another aspect of the invention, there is provided an eyeglass frame having at least one fastener portion, said fastener portion made of shape-memory alloy with a martensite transformation temperature below ambient temperature, said alloy having an austenite transformation temperature above which the alloy transforms to its austenite state and in so doing applies a fastening or unfastening force.

Still in yet another aspect of the invention, there is provided an eyeglass frame having a pair of rims and a pair of corresponding temples, said rims connected to said temples by a pair of hinge portions, said hinge portions made of shape-memory memory alloy with an austenite transformation temperature above ambient temperature, below said austenite transformation temperature said alloy being in its martensite state and being highly flexible and resistant to fatigue.

In another aspect of the invention, there is provided an eyeglass frame having at least one fastener portion, said fastener portion made of shape-memory alloy with a martensite transformation temperature above ambient temperature, said alloy having an austenite transformation temperature above which the alloy transforms to its austenite state and in so doing applies a fastener force, said alloy maintaining a fastening force when said alloy returns to its martensite state.

In yet another aspect of the invention, there is provided an eyeglass frame having at least one fastener portion, said fastener portion made of shape-memory alloy with a martensite transformation temperature below ambient temperature, said alloy having an austenite transformation temperature above which the alloy transforms to its austenite state and in so doing applies an unfastening force.

BRIEF DESCRIPTION OF THE DRAWING

FIGS. 2B-2E represent the stress-strain behavior of a fully annealed shape-memory alloy at four different temperatures wherein:

FIG. 2B—the temperature $T_1$ is below $M_s$;

FIG. 2C—the temperature $T_2$ lies slightly above $M_s$ and well below $M_d$;

FIG. 2D—the temperature $T_3$ is higher than $T_2$ but still below $M_d$;

FIG. 2E—the temperature $T_4$ is greater than $A_f$ and greater than $M_d$;

FIG. 12 is a partial perspective view of a fastening arrangement employing a shape-memory nut and/or bolt.

FIGS. 13 and 14 are the front view and a partial cross-sectional side view, respectively, showing the coupling of the nose bridge and temples to the lenses of the eyeglasses. FIG. 14 illustrates an alternate lens interface.

FIG. 15 is a perspective view of a shape-memory alloy rim which both engages a lens and pivotally engages a temple upon heat recovery.

FIG. 16 is a partial perspective view of a support for a nose pad for use in the present invention.

FIG. 17 is a partial perspective view of a one-piece hinge in accordance with the present invention.

FIG. 18 is a cross-sectional view of a temple employed in the present invention.

DESCRIPTION OF THE PREFERRED EMBODIMENTS

Figure 1:
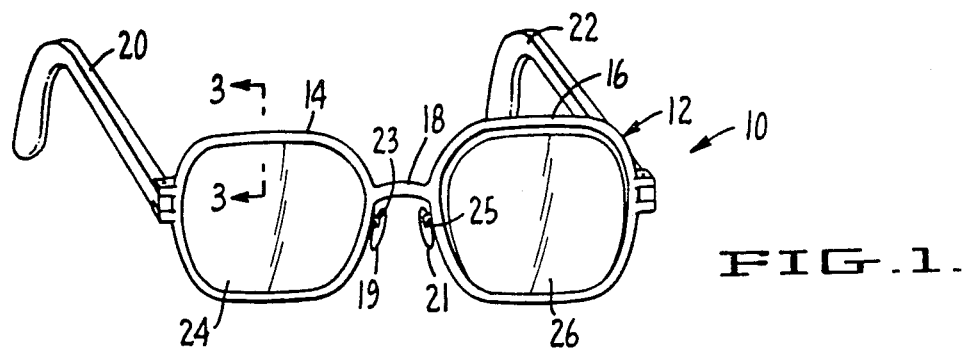
FIG. 1 is a perspective view of a generic eyeglass frame including detail with respect to one embodiment of the invention.

Referring to FIG. 1, eyeglasses shown generally at 10 are shown having a frame 12. The frame 12 includes two eyeglass rims 14 and 16, a nose bridge 18, nose pads 19 and 21, and temples 20 and 22 which are hinged to the rims 14 and 16, respectively. The temples 20 and 22 extend back over the ears of the wearer (not shown), the bridge 18 joins the two lenses, and the nose pads, which rest on the nose of the wearer, are attached to the rims by wires 23 and 25.

FIGS. 2A through 2F represent stress-strain graphs of a typical shape-memory alloy under different conditions. The temperature T is the temperature at which the stress-strain test are conducted and is generally also within the temperature range in which the alloy is to be used.

Figure 2A:
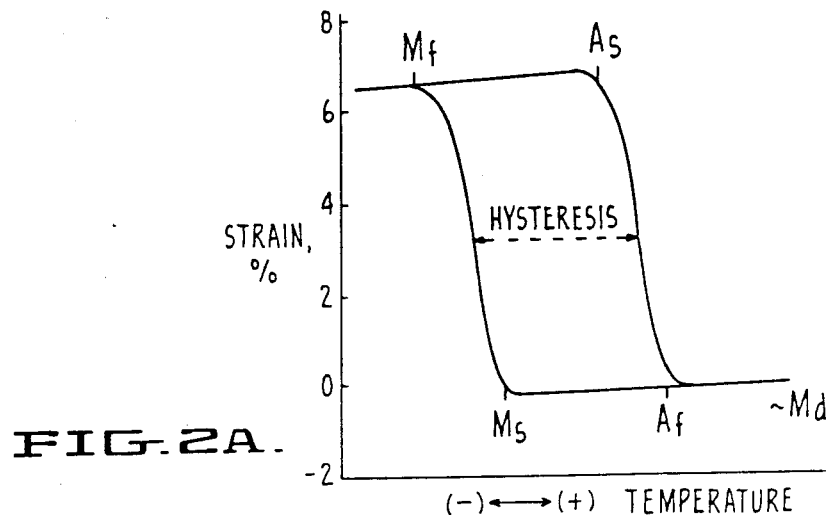
FIG. 2A is a graph of strain versus temperature at a fixed applied stress. The temperatures which characterize the transformation between the austenite and martensite phases of a shape-memory alloy are defined on the graph.

The mechanical properties of shape-memory alloys are very dependent upon processing and temperature, particularly in the temperature range near the transformation temperatures depicted in FIG. 2A.

To characterize the mechanical properties of frame components, the uniaxial tensile properties will be cited because they are the most easily tested and compared to other materials or other results. To test the frame components in question, the straight blade of the temples with uniform cross-section were pulled in a standard testing machine while strain was measured using an extensometer fastened to the actual test section under study and the load was measured by the testing machine.

In FIG. 2A the strain $\dot{E}$ that the alloy undergoes when subjected to a fixed stress $\hat{U}$ is plotted as a function of temperature. Upon cooling, there is a sudden increase in strain when the alloy reaches the martensite start transformation temperature, $M_s$, at which temperature the high temperature structure austenite microstructure begins to transform into the much softer low temperature martensite microstructure. The increase in strain continues until the alloy is completely converted into martensite at the martensite finish temperature, $M_f$. When the alloy is reheated the transformation back to austenite begins at the austenite start temperature, $A_s$, and is completed at austenite finish temperature, $A_f$. Generally, $A_s$ is somewhat higher than $M_f$, and the curve of the temperature difference between the cooling and heating is called hysteresis. The width of the hysteresis can be 10° C. to 100° C. in nickel titanium alloys and even wider in some copper-based alloys.

Figure 2B:
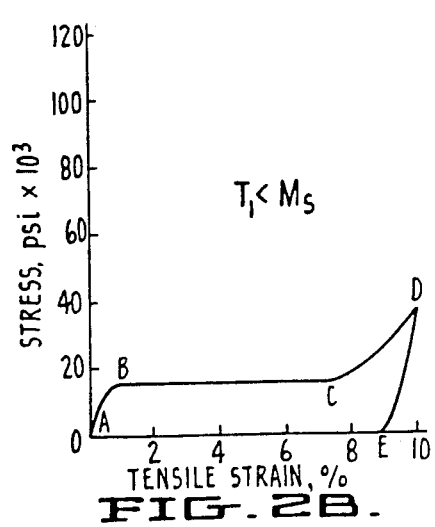
Figure 2C:
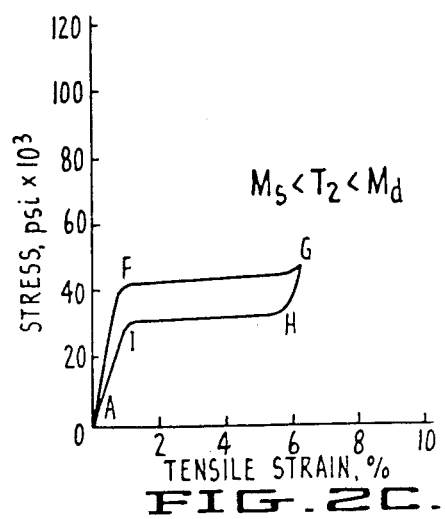
Figure 2D:
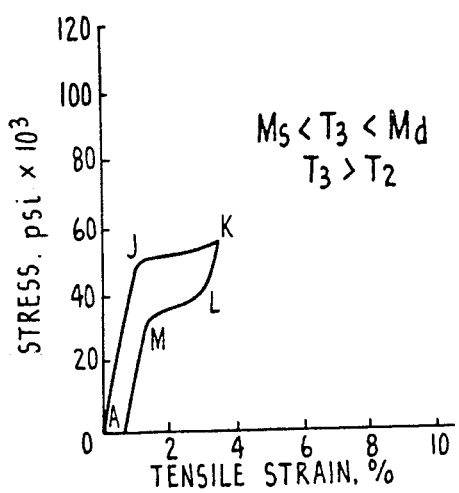
Figure 2E:
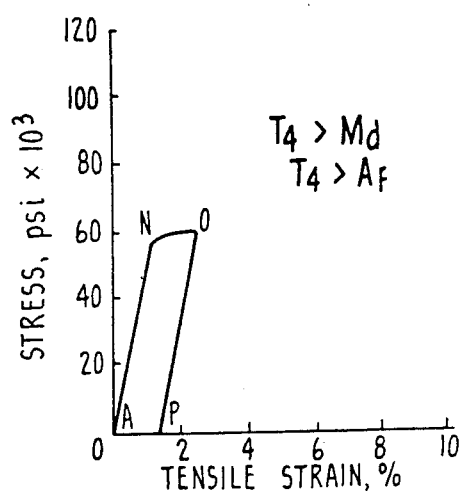
Figure 2F:
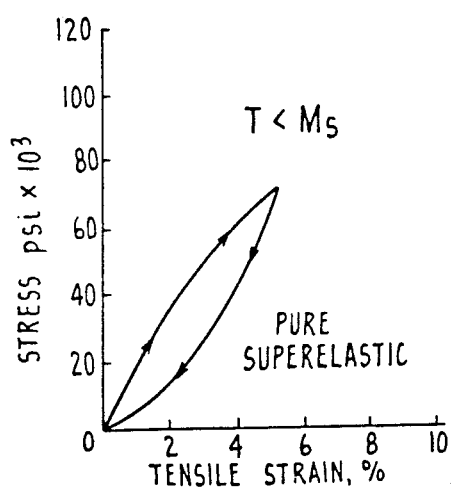
FIG. 2F represents the stress-strain behavior of a martensite alloy at $T<M_s$, such as shown in FIG. 2B, which alloy has been work-hardened. This is the behavior defined as superelastic.
Figure 2G:
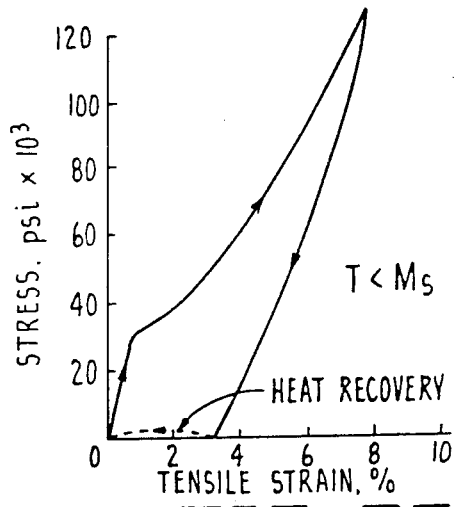
FIG. 2G shows a combination of elastic and shape-memory properties at $T<M_s$ for an alloy, such as shown in FIG. 2B, which has been work-hardened and partially annealed.
Figure 2H:
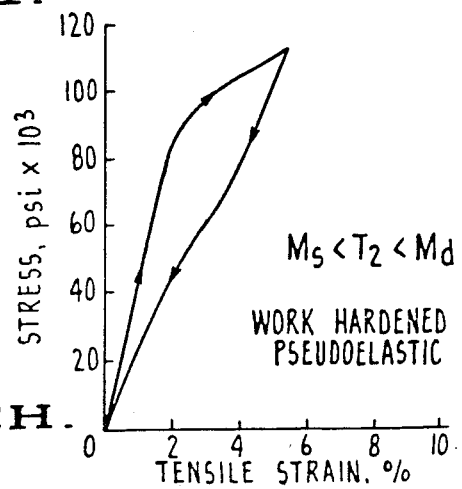
FIG. 2H shows the stress-strain behavior of a martensite alloy at $M_s<T<M_d$, such as shown in FIG. 2C, which alloy has been work-hardened. This behavior is defined as "optimized elasticity".

It has been found, however, that when the alloy is subjected to work-hardening of at least about 30%, preferably at least about 40%, plastic deformation, a different set of stress-strain curves is obtained, and specific components of an eyeglass frame can be made utilizing an alloy having an appropriate temperature range (T), plus such work-hardening (and, in some cases, subsequent annealing) to achieve desired properties. For example, substantial work-hardening of a shape-memory alloy (that is, about 30% or more plastic deformation) results in a highly springy "pure superelastic" behavior at $T<M_s$, as shown in FIG. 2F. This figure should be contrasted with FIG. 2B which shows the same alloy without work-hardening. At $M_s<T_2<M_d$ the same alloy will behave as shown in FIG. 2H where it is described as "work-hardened pseudoelastic." FIGS. 2F and 2H represent the ideal characteristics for use in purely elastic eyeglass components, e.g., temples bridges, and nose pad support wires. Whereas the pseudoelastic behavior in FIG. 2C is too limited in temperature range to be useful, the behavior in FIG. 2F or FIG. 2H can be achieved throughout the range −20° C. to +40° C. by selecting an alloy with an appropriate $M_s$ temperature and processing the alloy to achieve optimum work-hardening. Should the alloy be exposed to temperatures above $M_s$, the work-hardened pseudoelastic behavior of the alloy, as shown in FIG. 2H, ensures that it retains the desired elasticity and strength.

By carefully working-hardening the frame material to the appropriate level and then retaining this work-hardening after all other processing by not performing any anneals, it is possible to obtain an extremely "springy" component whose yield strength is acceptably high at all relevant temperatures. At temperatures below the materials's $M_s$ temperature, the work-hardened structure will not undergo easy heat-recoverable strain as shown in FIG. 2B, but rather exhibits the behavior shown in FIG. 2F. If the service temperature should fall between $M_s$ and $M_d$ for the alloy, the extreme springiness due to the pseudoelastic effect is partially retained while the resistance to permanent deformation of either the martensite or austenite phases due to the work-hardening is utilized (FIG. 2H). In all of these situations, the low effective modulus of the material and the enhanced yield strength due to the correct retained work-hardening make possible components with an elasticity many times that of standard frame materials.

To achieve the desired very high elasticity property throughout the temperature range for eyeglass frame usage (i.e., about −20° C. to +40° C.), it is desirable to combine aspects of both pseudoelasticity and superelasticity in the components. (See FIGS. 2C and 2F.) This is achieved by choosing an alloy whose pseudoelastic temperature range matches the upper portion of the desired service temperature range (i.e., from about 10° C. to 40° C.) and applying work-hardening to achieve satisfactory superelastic behavior in the lower portion of the service temperature range. By applying work-hardening of at least about 30% to the component, plastic and heat-recoverable strains in the martensite phase, up to a stress of at least 75 ksi (517 MPa), are suppressed. In the pseudoelastic temperature region, the properties then become a combination of superelastic and pseudoelastic, i.e., "optimized elasticity" properties (see FIG. 2H) up to stresses of at least 75 ksi (517 MPa).

Thus, throughout the temperature region of interest for eyeglass frames, the component acts completely elastically up to strains of 6% or more. This is many times the range achieved with traditional metal frame materials.

For example, a suitable component can be made using a shape-memory alloy having a transformation temperature of 0° C. Swaging a temple section to 0.060" (1.52 mm) diameter, annealing the section at 600° C. for 15 minutes, and then pressing that section to a flattened section of 0.036" (0.92 mm)×0.083" (2.11 mm) (plastic deformation of greater than 45%) will impart sufficient cold work. Said component will support a stress of over 150 ksi (1,033 MPa) at 4% tensile strain and show complete elastic spring back at room temperature. It is understood that alternate ways of imparting equivalent amounts of cold work, such as by an additional swaging step, or by rolling or pressing to other shapes, will result in similar strength and elasticity properties.

From the above, it can be seen that an eyeglass frame may be constructed with portions thereof exhibiting optimized elasticity, such portions being made from shape-memory alloy work-hardened at least about 30%, preferably at least about 40%, and having greater than 6% elasticity over a temperature range from −20° C. to +40° C.

To utilize the shape-memory feature, especially in such components as temples, it is necessary to achieve a fairly high effective yield strength (not less than about 30 ksi [207 MPa]) while still retaining sharp, complete shape-memory recovery from deformations as large as 6% outer fiber strain. Work-hardening and partial annealing resulting an alloy which, below $M_s$, has a combination of higher yield strength, very springy elastic behavior, and some shape-memory characteristic. This behavior is shown in FIG. 2G. This is accomplished by a final forming step of the component that applies at least about 30% plastic deformation and results in a yield strength of at least 75 ksi (517 MPa) in the component, followed by final heat treatment to reduce the yield strength from the work-hardened value of at least 75 ksi (517 MPa) to a heat-treated level of 30 ksi (207 MPa) to 50 ksi (344 MPa). This sequence gives a fully recoverable strain potential of at least 6%. Optimum processing employs a final shaping operation which imparts approximately 35–40% cold work, followed by a heat treatment above room temperature but below 400° C. (e.g., about 275° C.) for over one hour, which reduces the yield strength to 30 to 50 ksi (207 to 344 MPa).

By way of example, a temple component may be made by swaging the material to 0.070" (1.78 mm) diameter and annealing at 600° C. for 15 minutes. The component is then pressed to a flattened cross-section of 0.0875" (2.22 mm) wide×0.049" (1.25 mm) thick (a plastic deformation of over 35%). The component at this point has a yield strength of over 99 ksi (682 MPa). The component is then annealed at 280° C. for five hours. The resulting component has a tensile yield strength of 31 ksi (214 MPa) and a tensile strength of 125 ksi (861 MPa) at 7.5% strain; upon unloading the component gives 3.7% elastic spring back and imparts 3.8% shape-memory recovery when heated.

As another example, to obtain a "stiffer" temple, a component may be swaged to 0.075" (1.91 mm) diameter and then pressed to 0.097" (2.46 mm)×0.049" (1.25 mm) (over 38% plastic deformation) after annealing at 400° C. for 30 minutes. A final anneal of 250° C. for eight hours gives a component with a yield strength of about 49 ksi (338 MPa) (compared to about 110 ksi [758 MPa] prior to the anneal) and a tensile strength of 113 ksi (778 MPa) at 7.25% strain; when heated the component gives 5.0% elastic spring back and imparts 2.25% shape-memory recovery. It is understood that alternate ways of imparting equivalent amounts of cold work, such as by an additional swaging step, or by rolling or pressing to other shapes, will result in similar strength, shape-memory recovery, and elasticity properties.

From the above, it can be seen that an eyeglass frame may be fabricated having portions thereof made from shape-memory alloy, such portions having a minimum of 3% heat-recoverable shape-memory, a yield strength greater than 30 ksi (207 MPa), and at least 3% elasticity.

For components in which one uses the shape-memory properties to accomplish fastening or clamping functions, material as described in FIGS. 2B or 2G may be used. The transformation temperature of the material may be chosen to allow cooling to obtain the martensite structure, and reversion to austenite would occur upon warming to service temperature; alternatively, the material would require heating above the service temperature to cause transformation to austenite, triggering the shape-memory effect. In service the components might be either austenite or martensite.

From the above it can be seen that an eyeglass frame may be fabricated having at least one fastener portion made of shape-memory alloy with a martensite transformation temperature below ambient temperature, said alloy having an austenite transformation temperature above which the alloy transforms to its austenite state, and in so doing applies a fastening force. The alloy may alternatively have a martensite transformation temperature above ambient temperature, so that raising the alloy to its austenite state will cause the alloy to apply a fastening force, said fastening force being maintained when the component is cooled to its martensite state.

In components which utilize the flexible fatigue resistant properties of the shape-memory alloys, such as in FIG. 17, the preferred material is the form described in FIG. 2B. The transformation temperature of the alloy should be above the service temperature range to ensure that the component is always martensite in service and therefore has a low martensite yield strength and large, reversible martensite strain. It is also possible, if the component desirably has a higher effective stiffness, to use the alloy in the form described in FIGS. 2F, 2G or 2H.

From the above it can be seen that an eyeglass frame may be fabricated having a hinge portion made from shape-memory alloy with an austenite transformation temperature above ambient temperature, below said austenite transformation temperature the alloy being in its martensite state and being highly flexible and resistant to fatigue.

The above-described shape-memory alloys are applied but not limited to portions of the eyeglass frame, as follows:

| (1) | Optimized elasticity | temples wires bridge |
|---|---|---|
| (2) | Elastic & memory | temples wires rims bridge |
| (3) | Fasteners (shape-memory only) | hinges wires rims |
| (4) | Martensite | hinges |

One alloy of the type that may be used to fabricate the above portions of the eyeglass frame is the subject of U.S. Pat. No. 3,351,463, which is incorporated herein by reference. Other literature describing the processing and characteristics of suitable compositions includes an article by Dr. William J. Buehler, the principal developer of 55 nitinol, and William B. Cross entitled "55-Nitinol—Unique Wire Alloy with a Memory," which appeared in the June 1969 issue of *Wire Journal*. A description of the materials and certain of the properties may also be found in the brochure entitled "Nitinol Characterization Studies" dated September 1969. This document, identified as N-69-36367, or NASA CR-1433, is available from the Clearinghouse for Scientific and Technical Information, Springfield, VA 22151. All of these publications are incorporated herein by reference.

Examples of shape-memory alloys are disclosed in U.S. Pat. Nos. 3,174,851 and 3,672,879, incorporated herein by reference. A titanium-nickel-cobalt alloy is disclosed in U.S. Pat. No. 3,558,369. Suitable binary nickel-titanium shape-memory alloys are well-known to those skilled in the art and, for example, are described in the patents and article of Buehler et al, mentioned above.

In FIG. 1, the rim 14 is shown in a contracted shape (recovered state) wherein the rim 14 abuts a lens 24 and forms a tight fit therewith. Rim 16 depicts an expandable shape (deformed state) rim relative to a lens 26, said rim accommodating the insertion of such a lens. In this embodiment the rims 14 and 16 apply a fastening force to the lenses.

The rims 14 and 16 are made of shape-memory alloy material such as, but not limited to, a nickel-titanium alloy, various aluminum brasses, copper alloys, and other known alloys that exhibit shape-memory effect. One well-known nickel-titanium alloy is known as nitinol. In this figure, by way of example, the shape-memory alloys may be formed to have a memory configuration to which they return when sufficient heat is generated therein. That is, the shape-memory alloy can be deformed and thereafter returns to its memory configuration when it is heated. This memory characteristic is attributed to changes of state in the metal or alloy from that of a deformed martensite state to a recovered austenite state in response to the application of heat. The rims 14 and 16 can be deformed while the alloy is in its martensite state and thereafter recovered to a memory configuration, i.e., to their recovered austenite state, thereby applying a fastening force by exposing the rims 14 and 16 to an appropriate temperature. The transition temperatures for shape-memory materials are known in the arts relating to shape-memory alloys. The methods in which the rims 14 and 16 are directed to a transition, or recovery, temperature include: adjusting the temperature of the environment surrounding the rims 14 and 16; passing current through rims 14 and 15 to generate heat due to the resistance of the material; using inductive heating; or by using other temperature control techniques. Preferably, a technique which permits close control of the temperature of the rims 14 and 16 is employed, e.g., dipping the rims in water of proper temperature.

In one mode of operation, the rims are in the recovered austenite state when the lenses are in final position. Rim 14 is shown in memory configuration (recovered) in FIG. 1. In the deformed state, as seen with respect to rim 16, the rim is sufficiently large to enable the lens 24 to be inserted therein. Upon heating, the rim 16 will contract into tight contact with the lens 24, exerting a fastening force. Therefore, in this mode the rim is heated to close upon the lens to retain the lens.

The speed at which the rim 16 contracts may be closely controlled by controlling the application of heat to the rim 16. (This feature, it is noted, pertains to all of the embodiments of the invention as relate to recovery of the metals.)

In another mode of operation, the rim 14 may be in the deformed martensite state when closed and in tight contact with the lens. By heating the rim 14 in this mode, the rim in its deformed martensite state is recovered to its open and recovered austenite state enabling it to apply an unfastening force. Hence, in this mode, insertion and removal of a lens is performed when the rim is in the memory configuration corresponding to rim 16, and the lens is held in place by a deformed rim corresponding to rim 14.

Figure 3:
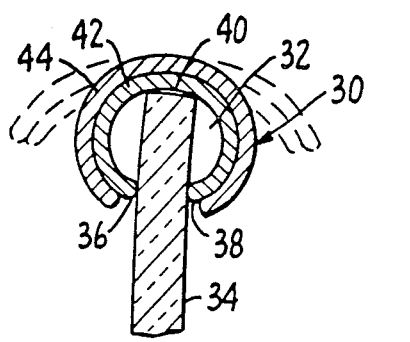
FIG. 3 is a cross-sectional view taken along section lines 3—3 in FIG. 1 of a lens-retaining rim to apply a fastening force with two-way action activated by heat.

Referring now to FIG. 3, a preferred cross-section for a rim 30 according to the invention is shown. The cross-section is C-shaped defining a channel 32 along the length of the rim 30. The channel 32 has a radial dimension which can be selectively increased or decreased to enable release of a lens 34, or retention of the lens 34, respectively. As previously suggested, either release (unfastening) or retention (fastening) can be effectuated by recovery to the memory configuration, the complementary operation being performed by deforming the radial dimension of the rim 30. Deformation of the shape-memory alloy comprising the rim while the alloy is in its martensite state may, if desired, be effected by compressing the channel radially inwardly to reduce the channel radius, the channel width being increased upon heating the alloy to the austenite state recovery temperature.

In considering FIG. 3, it should be noted that the lens 34 may be retrained (a) solely or primarily by the ridges 36 and 38 of the rim 30, or (b) by the ridge 36 and 38 together with a friction fit against the inner surface 40 of the rim 30.

As shown in FIG. 3, the rim 30 comprises an inner layer 42 and an outer layer 44. The inner layer 42 is shown having the ridges 36 and 38 disposed therealong. It is also within the scope of the invention to provide retaining ridges along the outer layer 44. In this latter embodiment, the C-shaped circumference of the outer layer 44 would be relatively greater than the circumference of the inner layer 43. Similarly, engaging the lens 34 by both layers 42 and 44 is also contemplated. In any of the above embodiments either the inner layer 42 or the outer layer 44 may be fabricated from a shape-memory alloy, depending upon whether the shape-memory alloy is being used to open or to close the C-shaped channel, as will become apparent from the following discussion. The other layer is then preferably stainless steel or some other relatively spring-like metal. When the outer layer 44 is shape-memory alloy, the rim 34 preferably closes upon heating to engage the lens 34. When the inner layer 42 is shape-memory alloy, the rim 30 opens to disengage the lens 34 upon heating to the memory (recovered) configuration. Accordingly, by dipping rim 30 into hot water, the wearer or practitioner is able to remove and replace the lens 34, which lens was engaged upon cooling. It should be recognized that the C-shaped cross-section may be provided in a closed rim (e.g., see FIG. 1) or partial rim embodiment.

Figure 4:
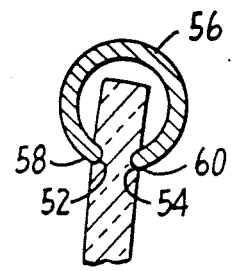
FIG. 4 is a cross-sectional view similar to FIG. 3 of an alternate embodiment.

The rim may comprise just a single layer of shape-memory material, as seen FIG. 4, if desired. FIG. 4 also illustrates in cross-section lens 50 having grooves 52 and 54 formed on opposite sides of the lens about its periphery. A C-shaped frame member 56 is disposed about the periphery of the lens and has terminal ends 58 and 60 seated in the grooves 52 and 54, respectively. In this embodiment the shape-memory alloy frame member 56 applies a fastening force when the alloy is in the austenite state.

A two-piece rim, such as illustrated in FIG. 3, may be employed, but preferably a single-piece rim of shape-memory alloy is employed. Elasticity is not a major factor in such an application, but strength is, and the grooves permit a secure hold on the lens.

It should be realized that the C-shaped cross-section of the rim 56 need not be circular as illustrated, but may be an alternate shape, e.g., U-shaped which alternate shape would function similarly. It is also within the scope of the invention to have the rims expand and contract circumferentially. In FIG. 1 the rim 16 is shown to be circumferentially expanded with respect to rim 14.

Figure 5:
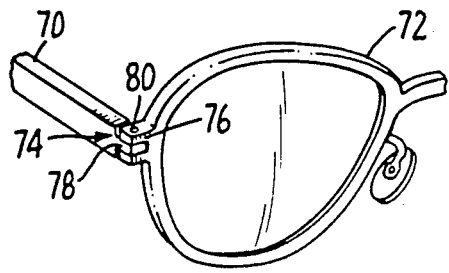
FIG. 5 is a partial cross-sectional view of an eyeglass frame temple pivotally coupled to a rim by a fastener portion.

Referring now to FIG. 5, the fastening of an eyeglass frame temple 70 to an eyeglass frame rim 72 with a fastener portion, shown generally at 74, is detailed. The fastener portion 74 comprises a shape-memory alloy member 76 having a U-shaped cross-section which extends from the rim 72. Positioned within the U-shaped portion of member 76 is the end portion 78 of the temple 70. Pin 80 enables the temple 70 and the member 76 to be pivotably coupled when the member 76 is closed in the U-shape, as shown in FIG. 5. The member 76 is shown in its memory configuration, i.e., when the alloy is in its recovered austenite state. It is understood that the member 76 will remain in this memory configuration even if it is cooled to its martensite state and may function in that condition. The member 76 may be deformed by spreading arms which comprise the U-shape apart from each other in said member's deformable martensite state, which, depending upon the specific alloy and the transformation temperature, may be at a cold temperature. Below the transition temperature the temple 70 is thus uncoupled from the member 76. The temple 70 can be pivotally re-coupled by the member 76 when the alloy of the member 76 is in its recovered austenite state. In such an embodiment, a shape-memory member is employed and recovered to the initial position by heat which may be room temperature.

Figure 6:
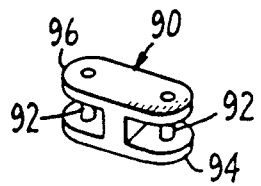
FIGS. 6, 7, 9 and 10 are exploded partial perspective views of various embodiments of shape-memory alloy fasteners employable in coupling a temple to a rim as in FIG. 5.

In FIG. 6, a dual open-ended fastener is shown generally at 90 having an H-shaped cross-section. Pins 92 are located at each end of the fastener 90. At least one end 96 of the fastener 90 is deformable to open the space between the arms of that end of the H-shaped cross-section, and that end is recoverable by heating to a transition recovery temperature. Fastener 90 may be used in an application, such as that shown in FIG. 5, to connect a temple 70 and an eyeglass frame rim (not shown).

Figure 7:
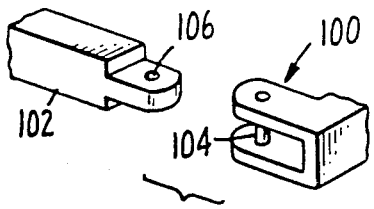
Figure 8:
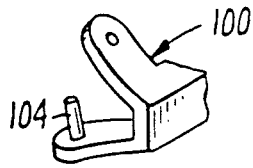
FIG. 8 is a perspective view of the fastener of FIG. 7 in the opened configuration.

The operation of the fastener 90 of FIG. 6 is similar to that of a single open-ended fastener shown generally at 100 in FIGS. 7 and 8. In FIG. 7, the single, open-ended shape-memory fastener 100 is shown closed, adjacent temple end portion 102. Pin-like portion 104 is capable of extending through an aperture 106 in the temple end portion 102, thereby forming a pivotal coupling. In FIG. 8, the fastener 100 is open to permit the insertion or removal of a temple end portion.

The scope of the invention is not limited to a single pin such as pin 04, but also included is the concept of two half pins (not shown), one half which may extend from each arm of the U-shaped fastener 100 to engage an aperture such as 106 in temple portion 102. Also, both members, the temple and frame member, may be yokes with opposed pins, or hemispheres, engaging opposed holes in the other member.

Figure 9:
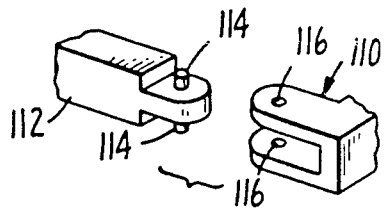

FIG. 9 illustrates another type of fastener shown generally at 110. Rather than having a pin 104 as in FIG. 7, temple end portion 112 has two half pins 114 extending therefrom which are receivable in complementary openings 116 in U-shaped member 110. As in the embodiments of FIGS. 7 and 8, member 110 made of shape-memory alloy can similarly open and close to provide a pivotal coupling.

Figure 10:
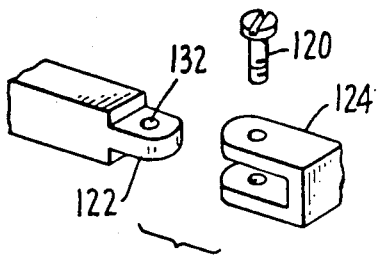

In FIG. 10 a pivotal coupling is achieved by means of a stud or screw made from shape-memory alloy. The screw 120 is twisted, or in the case of a stud is pushed, easily into complementary apertures in a temple end portion 122 and a non-shape-memory U-shaped element 124 when aligned. When recovered, the screw or stud 120 expands to tightly engage the U-shaped element 124. It is understood that element 124 may be a separate element, as shown, or may be a portion of the rim such as member 76, shown in FIG. 5.

Figure 11:
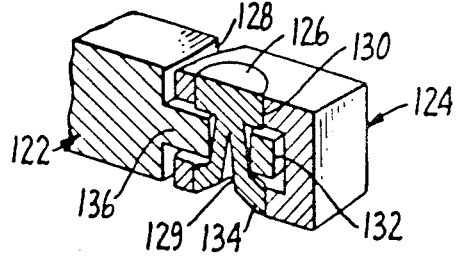
FIG. 11 is a partial cross-sectional view of a fastener employable in the embodiment of FIG. 10.

If the element 120 is a stud, it may take the form of the stud of FIG. 11. The stud 120 has a head portion 126 seated in a recess 128 in the member shown generally at 122. A split shank 129 extends from head 126 through a hole 130 in a member, shown generally at 124, and through aligned hole 132 in the end member, shown generally at 122 of the temple. The end of the stud 120 has a short outwardly extending lip 134 which catches on the surface of a shoulder 136 in the bottom leg of the U-shaped member 124.

When it is in its deformed martensite state, the member 120 which is radially compressed slips readily through the aligned holes in the temple 122 and U-shaped member 124. When expanded, the lip 134 locks into the recess 136 and also engages the side walls of the temple and lower U-shaped member to lock the members together.

In FIG. 12, a fastener in the form of a bolt and nut assembly is shown generally at 140 to provide fastening for a lens 142 to an eyeglass rim or other member. As shown therein, the bolt 144 extends through a rim 146 and the lens 142 and engages a complementary nut 148. The bolt 144 and/or the nut 148 are made from shape-memory alloy material. When the bolt 144 is made of shape-memory alloy, it is preferably deformed by being axially elongated, and therefore radially compressed, in its martensite state prior to being inserted into the nut 148. When the nut is made of shape-memory alloy, it is preferably deformed by being expanded radially before the bolt 144 is inserted therein. When recovered the shape-memory alloy bolt 144 contracts longitudinally and expands radially. The shape-memory alloy nut 148 contracts radially to effect tight coupling therebetween. The magnitude of contraction and/or expansion is readily controlled by the predefined memory configuration of the bolt 144 and/or nut 148. These elements may also be recessed.

An alternative for securing a lens to a rim is illustrated in FIGS. 13 and 14 wherein relatively small arcuate rim members are provided which clamp each individual lens at the temples and at the nose piece. Specifically, shape-memory members 150 and 152 are preferably square and C-shaped in cross-section and arcuate to conform to the circumferential curvation of lenses 154 and 156, respectively. Members 150 and 152 may be integral with the entire bridge of the eyeglasses. The lenses are preferably grooved, as noted, with respect to the embodiment of FIG. 4 to mate with the ends of the C-shaped members.

Referring again to FIG. 13, temples 158 and 160 are secured via hinges 162 and 164, to the lens 154 and 156, by members 166 and 168 which are substantially identical to members 150 and 152, except for the hinge pieces. The method of connection to the lens is also identical. No temple nor nose pads and wires are shown, but they are considered to be within the scope of the invention. The various members 150, 152, 166 and 168 are greatly enlarged in the drawings for purposes of clarity of illustration, but in reality provide a substantially rimless eyeless of sturdy construction, yet with the ability to readily replace defective parts. FIG. 14 illustrates in cross-section an alternative to grooving the lens wherein a lens such as lens 154 is cut away on each side thereof at the edge of the lens to accommodate gripping by shape-memory alloy element 150.

FIG. 15 shows an eyeglass frame generally at 170 having shape-memory rims 172 and 174 which contract radially inwardly in cantilever fashion at the far ends thereof when heated to a recovery temperature. As the rims 172 and 174 decrease in radius upon recovery, lenses 176 and 178 inserted therein are engaged by the rims 172 and 174, and temples 180 and 182 are pivotally engaged. Specifically, protrusions 184, 186, 188 and 190 enter depressions or holes in the temples 180 and 182, respectively.

Further in regard to FIG. 15, it is noted that the temples 180 and 182 may be made from shape-memory alloy, stainless steel, or some other metal when coupled to the rims 172 and 174 with a hinged joint as shown.

Alternatively, the joint may comprise a thin section of shape-memory alloy such as nitinol which has good flexibility and fatigue properties. That is, instead of using a multi-piece hinge, pivotal coupling may be achieved by using a foldable length of shape-memory alloy 201 disposed between each rim 172, 174 and temples 186, 182, respectively, as illustrated in FIG. 17. Piece 201 is made of shape-memory alloy with an austenite transformation temperature above ambient temperature wherein below said austenite transformation temperature (i.e., ambient temperatures to which the eyeglasses are exposed in use) the alloy is in its martensite state and is therefore highly flexible and resistant to fatigue.

Turning now to FIG. 16, nose rest 21 is shown coupled to a rim 16 by a nose pad wire 25 which is connected to rim 16. Nose pad 21 may be tightly coupled to nose pad wire 25 by a shape-memory alloy fastener 27. The fastener 27 is deformable in its martensite state from the configuration shown to enable the fastener to be inserted or removed. When recovered to its austenite state, the fastener 27 encompasses and engages the pad 27. More importantly, the wire 25 may, like the temples 20 and 22 and the bridge 18 shown in FIG. 1, be made of shape-memory alloy which is resistant to permanent deformation or kinking over the full range of ambient temperatures. The wires may alternatively be formed from shape-memory alloy which is sufficiently resistant to deformation end which is readily restorable to its undeformed shape by heating.

Referring more specifically to FIG. 17, there is illustrated a hinge for the temple frame connection. In this modification, both the end 200 of the temples 202 and an extension 204 from frame 206 have deep recesses 208 and 210, respectively, to accommodate piece 201. The hinge piece 201 could also be riveted to the frame and temple. The temples may also advantageously employ shape-memory alloy as previously described.

Referring now specifically to FIG. 18, a cross-section of a temple shown generally at 212 comprises a U-shaped member 214 of shape-memory alloy filled with a stiffening insert 216. For extra strength the shape-memory alloy member could be an I-beam or could have an optional outward decorative ridge, such as ridge 218 (illustrated in phantom line). If such configuration is employed, the channel could be eliminated and the whole temple covered in plastic. Further, the channel 214 could have return legs which close about a stainless steel or similar stiffening insert to form an elastic member having memory. The insert 216 may thus be a thin blade of material which adds strength to the structure but which is not strong enough to defeat the memory effect of the memory material.

Other improvements, modifications and embodiments will become apparent to one of ordinary skill in the art upon review of this disclosure. Such improvements, modifications and embodiments are considered to be within the scope of this invention as defined by the following claims.

What is claimed is:

1. An eyeglass frame having at least a portion thereof fabricated from nickel-titanium based shape-memory alloy, said portion being in the work-hardened pseudoelastic metallurgical state, said portion having been subjected to work-hardening and having a low effective elastic modulus giving a soft, springy feel, said portion having greater than 3% elasticity over a temperature range from $-20°$ C. to $+40°$ C.

2. An eyeglass frame as in claim 1 wherein said frame includes a pair of temples, said portion comprising said temples.

3. An eyeglass frame as in claim 1 wherein said frame includes a bridge, said portion comprising said bridge.

4. An eyeglass frame as in claim 1 wherein said eyeglass frame includes a pair of lens rims and a pair of nose pads, each nose pad connected to a respective rim by a nose pad wire, said portions comprising said nose pad wires.

5. An eyeglass frame having at least a portion thereof fabricated from nickel-titanium based shape-memory alloy, said portion being in the work-hardened and heat-treated condition, said portion having been subjected to at least 30% work-hardening followed by a heat-treatment at a temperature not exceeding 400° C. for not less than one hour and having a minimum of 3% heat-recoverable shape-memory, a yield strength greater than 30,000 psi and at least 3% elasticity.

6. An eyeglass frame as in claim 5 wherein said frame includes a pair of temples, said portions comprising said temples.

7. An eyeglass frame as in claim 5 wherein said frame includes a bridge, said portion comprising said bridge.

8. An eyeglass frame as in claim 5 wherein said eyeglass frame includes a pair of lens rims and a pair of nose pads, each nose pad connected to a respective rim by a nose pad wire, said portions comprising said nose pad wires.

* * * * *

UNITED STATES PATENT AND TRADEMARK OFFICE
CERTIFICATE OF CORRECTION

PATENT NO. : 4,896,955

DATED : January 30, 1990

INVENTOR(S) : Robert B. Zider et al.

It is certified that error appears in the above-identified patent and that said Letters Patent is hereby corrected as shown below:

On the title page

References Cited, delete "56-705520 6/1981 Japan" since the reference is already correctly listed as "56-70520 6/1981 Japan".

Column 2, line 68, following "shape-memory" delete "memory".

Column 5, line 21, following "temples" insert --,--, a comma.

Column 6, line 32, delete "resulting an" and insert therefor --result in an--.

Column 6, line 34, delete "characteristic" and insert therefor --characteristics--.

Column 8, line 13, delete "1969issue" and insert therefor --1969 issue--.

Column 8, line 28, delete "et al," and insert therefor --et al.--.

Column 9, line 44, delete "ridge" and insert therefor --ridges--.

Column 10, line 6, following "seen" insert --in--.

UNITED STATES PATENT AND TRADEMARK OFFICE
CERTIFICATE OF CORRECTION

PATENT NO. : 4,896,955
DATED : January 30, 1990
INVENTOR(S) : Robert B. Zider et al.

It is certified that error appears in the above-identified patent and that said Letters Patent is hereby corrected as shown below:

Column 11, line 5, following "pin", second occurrence, delete "04" and insert therefor --104--.

Column 13, line 1, delete "end" and insert therefor --and--.

Signed and Sealed this

Twenty-sixth Day of March, 1991

Attest:

HARRY F. MANBECK, JR.

*Attesting Officer*   *Commissioner of Patents and Trademarks*